United States Patent
Park et al.

(10) Patent No.: US 9,888,372 B2
(45) Date of Patent: Feb. 6, 2018

(54) COMMUNICATION METHOD OF IN-VEHICLE COMMUNICATION APPARATUS IN WIRELESS COMMUNICATION SYSTEM, AND APPARATUS THEREFOR

(71) Applicant: LG ELECTRONICS INC., Seoul (KR)

(72) Inventors: Kungmin Park, Seoul (KR); Hyunsoo Ko, Seoul (KR); Ilmu Byun, Seoul (KR); Heejeong Cho, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/125,108

(22) PCT Filed: May 30, 2014

(86) PCT No.: PCT/KR2014/004864
§ 371 (c)(1),
(2) Date: Sep. 9, 2016

(87) PCT Pub. No.: WO2015/147376
PCT Pub. Date: Oct. 1, 2015

(65) Prior Publication Data
US 2016/0381539 A1 Dec. 29, 2016

Related U.S. Application Data

(60) Provisional application No. 61/969,278, filed on Mar. 24, 2014.

(51) Int. Cl.
*H04M 11/04* (2006.01)
*H04W 4/22* (2009.01)
(Continued)

(52) U.S. Cl.
CPC ............ *H04W 4/22* (2013.01); *H04W 4/046* (2013.01); *H04W 72/048* (2013.01);
(Continued)

(58) Field of Classification Search
CPC ........... H04W 72/042; H04W 72/0413; H04W 72/0453; H04W 72/04; H04W 72/044;
(Continued)

(56) References Cited

U.S. PATENT DOCUMENTS

2004/0162052 A1* 8/2004 Jang .................. H04W 4/22
455/404.2
2009/0054029 A1 2/2009 Hogberg et al.
(Continued)

FOREIGN PATENT DOCUMENTS

KR    10-2008-0095605    10/2008
KR    10-2009-0012540    2/2009
(Continued)

OTHER PUBLICATIONS

PCT International Application No. PCT/KR2014/004864, Written Opinion of the International Searching Authority dated Dec. 12, 2014, 21 pages.

*Primary Examiner* — Khalid Shaheed
(74) *Attorney, Agent, or Firm* — Lee Hong Dederman Kang Waimey

(57) ABSTRACT

The present invention relates to a communication method of an in-vehicle communication apparatus in a wireless communication system, and an apparatus therefor. One embodiment of the present invention comprises: establishing, by a communication apparatus, a connection with a base station; allocating, by the base station, an uplink resource for use in transmission of location information of a vehicle before the location information is transmitted; and if the communication apparatus is required to transmit an emergency signal to
(Continued)

the base station, transmitting the emergency signal using the allocated uplink resource.

10 Claims, 14 Drawing Sheets

(51) Int. Cl.
| | | |
|---|---|---|
| *H04W 72/04* | (2009.01) | |
| *H04W 4/04* | (2009.01) | |
| *H04W 76/04* | (2009.01) | |
| *H04W 4/02* | (2009.01) | |
| *H04W 88/08* | (2009.01) | |

(52) U.S. Cl.
CPC ..... *H04W 72/0413* (2013.01); *H04W 76/046* (2013.01); *H04W 4/02* (2013.01); *H04W 88/08* (2013.01)

(58) Field of Classification Search
CPC ..... H04W 4/22; H04W 76/007; H04W 4/046; H04W 4/02; H04W 76/00; H04W 4/00; H04W 64/00

See application file for complete search history.

(56) References Cited

U.S. PATENT DOCUMENTS

| | | | |
|---|---|---|---|
| 2013/0010622 A1* | 1/2013 | Horn | H04W 72/085 370/252 |
| 2014/0140247 A1* | 5/2014 | Venkata | H04W 4/22 370/259 |
| 2015/0268059 A1* | 9/2015 | Borghesani | G01C 21/3697 701/32.3 |

FOREIGN PATENT DOCUMENTS

| | | |
|---|---|---|
| KR | 10-2010-0040756 | 4/2010 |
| KR | 10-2013-0100744 | 9/2013 |

\* cited by examiner

COMMUNICATION METHOD OF IN-VEHICLE COMMUNICATION APPARATUS IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/004864, filed on May 30, 2014, which claims the benefit of U.S. Provisional Application No. 61/969,278, filed on Mar. 24, 2014, the contents of which are all hereby incorporated by reference herein in their entirety.

TECHNICAL FIELD

The present invention relates to a wireless communication system, and more particularly, to a method of communication by a communication device in a vehicle and apparatus for supporting the same.

BACKGROUND ART

In the initial period of the study related to the safety of a vehicle driver, although the studies have been focused on physical vehicle safety devices such as a safety belt and an airbag, as the technology of the wireless communication system develops recently, the study on the vehicle safety service utilizing the vehicle communication network is in progress by combining the developed wireless communication system with the study on the safety of the vehicle driver.

Particularly, when a vehicle possibly encounters an emergency due to an external or internal factor or it is determined that a device of the vehicle has failed, a vehicle safety service utilizing a vehicle communication network technology may refer to a service that helps a user to efficiently cope with such a problem.

A communication network within a vehicle may be classified into an in-vehicle network and an out-of-vehicle network. The in-vehicle network, which is called In Vehicle Network (IVN), refers to a wired or wireless communication network between sensors, electronic devices, or devices in the vehicle, and as mentioned above, the IVN is utilized in informing a vehicle user of an emergency or a failure.

Further, the vehicle communication network may include the technology about the out-of-vehicle network as well as the IVN.

Such a vehicle safety service utilizing the IVN is provided to a vehicle driver through an audio sound, a certain display of a dashboard, or the like in a vehicle depending on the purpose, but only the driver of the vehicle may recognize such information, and the driver of another vehicle in rear of the vehicle cannot recognize such information, thus there is a possibility of an accident or a secondary accident by the another vehicle in rear of the vehicle. Hence, there is a need for improvement for such a problem and studies on the vehicle safety service utilizing the out-of-vehicle network as well as the vehicle safety service utilizing the in-vehicle network are steadily in progress.

Namely, such a vehicle safety service utilizing the out-of-vehicle network refers to a technology introduced to provide a vehicle safety service utilizing the vehicle communication network technology in the relation with other neighbor vehicles. The out-of-vehicle networks may be classified into a vehicle to infrastructure (V2I) and a vehicle to vehicle (V2V).

In this case, the V2I refers to a communication infrastructure technology between a vehicle and a base station neighboring to the vehicle, and the V2V refers to a technology of a communication infrastructure between one vehicle and another vehicle.

If using the V2I technology, the vehicle can receive traffic information, etc. from the neighbor base station and transmit the location information of the vehicle and danger information sensed by the vehicle, to the neighbor base station. The base station and other vehicles can share the dangerous situation through the transmitted information.

If using the V2V technology, the vehicle can receive traffic information from a neighbor vehicle and danger information and the like sensed by the vehicles can be exchanged between the vehicles.

Likewise, the V2I and V2V technologies of vehicle safety services utilizing the out-of-vehicle network can be utilized for the purpose of mainly sharing information between the vehicle and another object. However, in the case of the V2I, an information exchange with another vehicle is performed through the base station. Hence, in comparison with the V2V in which information is directly exchanged between vehicles, the reliability of the exchanged information may be high. Yet, there is a disadvantage that the latency increases.

Therefore, with respect to the vehicle communication network technology, and more particularly, to the V2I technology among the vehicle safety services utilizing the aforementioned out-of-vehicle network, the demands for decreasing latency in the information sharing process and the corresponding scheme of decreasing the latency are rising.

DISCLOSURE OF THE INVENTION

Technical Task

The technical task of the present invention is to provide a method of efficiently transmitting an emergency signal in a manner of receiving allocation of an uplink resource required for a vehicle communication device to transmit the emergency signal to a base station in advance and then using the allocation uplink resource.

Technical Solutions

To achieve these objects and other advantages and in accordance with the purpose of the invention, a method of performing communication by an in-vehicle communication device in a wireless communication system, the method comprising: performing a connection to a base station by the in-vehicle communication device; receiving allocation of an uplink resource for being used in transmission of location information of the vehicle from the base station in advance before transmitting the location information; and transmitting an emergency signal by using the allocated uplink resource when the communication device should transmit the emergency signal to the base station.

In another aspect of the present invention, in an in-vehicle communication device for performing communication with a base station in a wireless communication system, an apparatus comprising: a radio frequency unit including a transmitting unit and a receiving unit; and a processor configured to support a communication execution by being connected to the transmission unit and the reception unit, wherein the processor is further configured to perform a connection to the base station, receive allocation of an uplink resource to use for a transmission of a location information of a vehicle from the base station, and control the communication device to transmit an emergency signal using the allocated uplink resource when the communication device transmits the emergency signal to the base station.

Advantageous Effects

According to the present invention, an emergency may be quickly informed as a vehicle communication device receives allocation of an uplink resource required for the vehicle communication device to transmit an emergency signal to a base station in advance and then using the allocation uplink resource.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Figure 1:
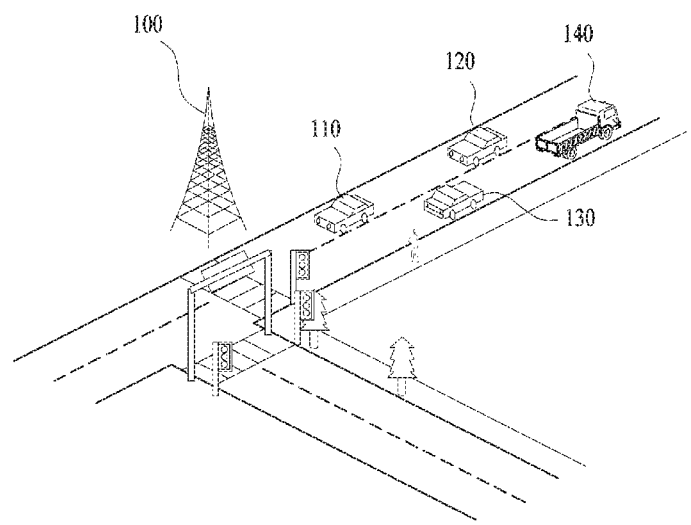
FIG. 1 is a diagram to describe a communication environment between a vehicle communication device and a base station in a wireless communication system applicable to the present invention.

FIG. 1 is a diagram to describe a communication environment between a vehicle communication device and a base station in a wireless communication system applicable to the present invention.

Referring to FIG. 1, a wireless communication system applicable to the present invention may include vehicles 110, 120, 130, and 140 including a base station (BS) 100 and one or more communication devices.

In the present specification, vehicles 110, 120, 130, and 140 including a communication device will be defined and expressed as a vehicle communication device for the convenience of explanation.

In the present specification, the BS 100 refers to a terminal node of a network directly communicating with vehicle communication devices 110, 120, 130, and 140. Further, in the present specification, certain operations explained to be performed by the BS 100 may also be performed by an upper node of the BS 100 depending on the situation.

Namely, it is obvious that various operations performed for communication with vehicle communication devices 110, 120, 130, and 140 in a network including a plurality of network nodes including the BS 100 can be performed by a BS or network nodes other than the BS.

In the present specification, the expression "base station (BS)" may be substituted by such expressions as "fixed station", "Node B", "eNode B (eNB)", and "access point (AP)".

Further, the vehicle communication devices 110, 120, 130, and 140 may also be referred to as a terminal, a mobile station (MS), a mobile subscriber station (MSS), a subscriber station (SS), an advanced mobile station (AMS), a wireless terminal (WT), a machine-type communication (MTC) apparatus, a machine-to-machine (M2M) apparatus, and a device-to-device (D2D) apparatus.

The embodiments of the present application may be implemented in at least one of IEEE 802 system, 3GPP system, 3GPP LTE and LTE-Advanced (LTE-A) system, and 3GPP2 system which are wireless communication systems, and at least one of them may be supported by the disclosed standard documents.

Figure 2:
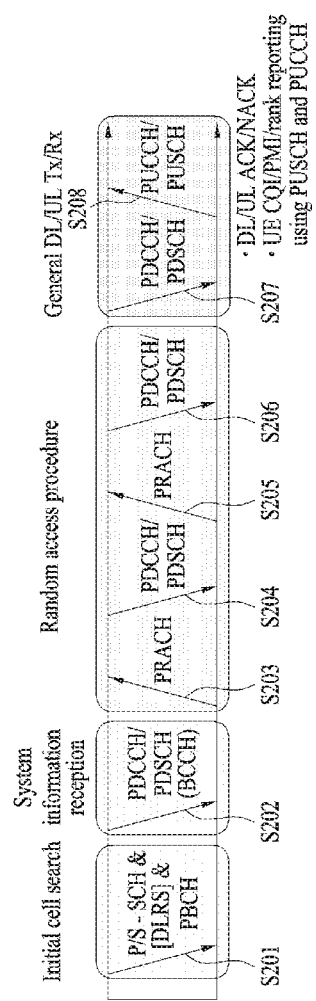
FIG. 2 is a diagram to describe physical channels used in a 3GPP long term evolution (LTE) system and a general signal transmission method by using the physical channels applicable to the present invention.

FIG. 2 is a diagram to describe physical channels used in a 3GPP long term evolution (LTE) system and a general signal transmission method by using the physical channels applicable to the present invention.

In a wireless communication system, a vehicle communication device may receive information through a downlink from a base station, and the vehicle communication device may transmit information to a base station through an uplink. The information transmitted or received by the vehicle communication device includes data, various control information, and emergency information according to an embodiment of the present invention, and various physical channels exist according to the types and uses of information transmitted or received by the vehicle communication device.

FIG. 2 illustrates physical channels used in a 3GPP LTE system which is an example of a wireless communication system applicable to the present invention, and signals transmitted by using the physical channels.

A vehicle communication device which is turned on in the power-off state or newly enters a cell performs an initial cell search job such as synchronizing with the base station in step S201. To this end, the vehicle communication device may receive a primary synchronization channel (P-SCH) and a secondary synchronization channel (S-SCH) from the base station so as to be synchronized with the base station and obtain information such as cell ID. Thereafter, the vehicle communication device may receive a physical broadcast channel from the base station so as to obtain broadcast information within the cell. Further, the vehicle communication device may receive a downlink reference signal (DLRS) in the initial cell search operation so as to check the downlink channel state.

The vehicle communication device which has completed the initial cell search may receive a physical downlink control channel (PDCCH) and a physical downlink sharing channel (PDSCH) according to the physical downlink control channel information in step S202.

Further, when connected to the base station for the first time or there is no wireless resource for the signal transmission, the vehicle communication device may perform a random access procedure such as steps S203 to S206 for the base station. The procedure will be described in detail with reference to FIGS. 4 and 5, but the vehicle communication device may transmit a certain sequence as a preamble through a physical random access channel (PRACH) (S203) and receive a response message to the random access through a PDCCH and a PDSCH corresponding to the PDCCH (S204). In the case of the contention-based random access except the handover, a contention resolution procedure such as the transmission of the additional physical random access channel (S205) and the reception of the PDCCH/PDSCH (S206) may be performed.

The vehicle communication device which has performed the above described procedure may perform reception of PDCCH/PDSCH (S207) and transmission of physical uplink shared channel (PUSCH)/physical uplink control channel (PUCCH) (S208) as the uplink/downlink signal transmission procedure. At this time, control information which the vehicle communication device transmits to the base station or the vehicle communication device receives from the base station includes a downlink/uplink ACK/NACK signal, channel quality indicator (CQI)/precoding matrix index (PMI)/rank indicator (RI), etc. In the case of 3GPP LTE system, the vehicle communication device may transmit control information such as the above-described CQI/PMI/RI through the PUSCH and/or PUCCH.

Figure 3:
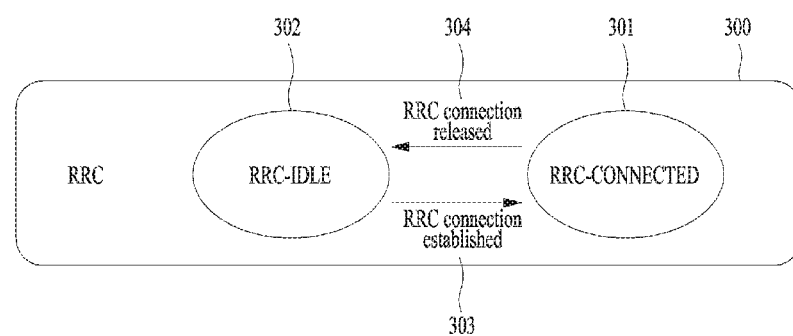
FIG. 3 is a diagram to describe a concept of a radio resource control (RRC) state of a vehicle communication device usable in the present invention.

FIG. 3 is a diagram to describe a concept of a radio resource control (RRC) state of a vehicle communication device usable in the present invention.

Referring to FIG. 3, a wireless resource control (RRC) layer which is located in the lowest part of the third layer among OSI 7 layers of the wireless interface protocol of a vehicle communication device based on 3GPP wireless connection is used for setting and controlling the function of the vehicle communication device and for exchanging control information between the wireless resource control layers of the base station (300).

The wireless resource control state inside the wireless resource control layer of the vehicle communication device is divided into a radio resource control connection (RRC_Connected) state 301 and a radio resource control idle (RRC_Idle) state 302.

Further, a vehicle communication device is included in a vehicle. Generally, a generator exists in the vehicle, and thus the vehicle communication device in the vehicle may not need to move the radio resource control (RRC) state to the RRC idle state. However, the vehicle communication device needs to save energy required of a general UE in the communication process. Hence, in the present invention, it is assumed that the technical features of the present invention can be performed by adjusting the RRC state of the vehicle communication device as in a general UE.

Further, when the user turns on power of the vehicle communication device for the first time, the vehicle communication device first searches for an appropriate, connectable cell, then remains in the RRC idle state 302 in the cell, or first stays in the RRC connection state 301 and, when receiving a RRC connection cancellation message, moves to RRC idle state 302 and remains in the RRC idle state 302.

The vehicle communication device staying in the RRC_Idle state 302 moves the state to the RRC connection state 301 through the connection process with the aforementioned base station when there is a need for receiving allocation of data or a resource to be transmitted/received to/from the base station (303).

Further, when there is no data transmitted/received to/from the base station, the vehicle communication device in the RRC connection state 301 receives a RRC_Connection Release message from the base station. The vehicle communication device receiving the RRC_Connection Release message moves the RRC connection state to the RRC idle state 302 (304).

Figure 4:
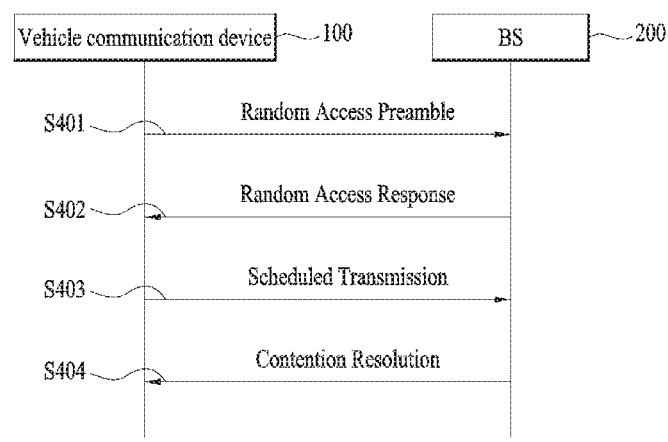
FIG. 4 is a diagram to describe a contention-based random access procedure usable in the present invention.
Figure 5:
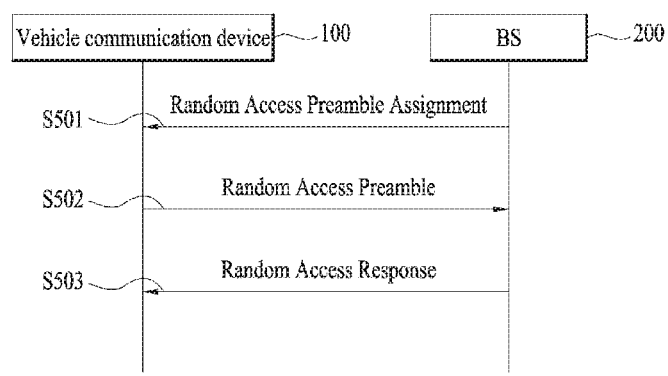
FIG. 5 is a diagram to describe a non-contention-based random access procedure usable in the present invention.

FIGS. 4 and 5 illustrate an example of a contention-based random access procedure and a non-contention-based random access procedure usable in the present invention.

Referring to FIGS. 4 and 5, FIG. 4 shows a contention-based random access procedure and FIG. 5 shows a non-contention based random access procedure.

The contention-based random access procedure randomly selects a random access channel preamble transmitted by the vehicle communication device 100 for an access to the base station 200.

Hence, a plurality of vehicle communication devices can select the same random access preamble at the same point of time and transmit the random access preamble to the base station, and thus there is a need for a contention resolution in the future.

On the other hand, as illustrated in FIG. 5, in the non-contention-based random access procedure, the base station 200 performs a random access procedure by using a random access preamble uniquely allocated to the vehicle communication device 100. As such, the vehicle communication device 100 can perform a random access procedure without collision with other vehicle communication devices.

Namely, the largest difference between the contention-based random access procedure and the non-contention based random access procedure is about whether the random access preamble is designated as dedicated to one vehicle communication device.

In the non-contention based random access procedure, the vehicle communication device uses a dedicated random access preamble designated to only the vehicle communication device itself. Hence, there is no competition (or collision) with another vehicle communication device. However, in the contention-based random access, a random access preamble randomly selected by the vehicle communication device among one or more random access preambles is used. Hence, there is a possibility of competition.

Here, the competition refers to attempting, by two or more vehicle communication devices, a random access procedure by using the same random access preamble through the same resource.

Referring to FIG. 4 again, the operation process of the vehicle communication device and the base station in the contention-based random access process will be described in detail.

(1) First Message Transmission (S401)

First, the vehicle communication device may randomly select one random access preamble from a set of random access preambles indicated through system information or a handover command and select physical random access channel (PRACH) resource which can transmit the random access preamble so as to be transmitted (S401).

(2) Second Message Reception (S402)

The vehicle communication device transmits a random access preamble as in step S401, then the base station tries reception of its random access response within the random access response reception window directed through system information or a handover command (S402).

Specifically, the random access response information may be transmitted in the form of MAC PDU, and the MAC PDU may be transmitted through a physical downlink shared channel (PDSCH). Further, in order for the vehicle communication device to appropriately receive information transmitted through the PDSCH, the vehicle communication device may monitor a physical downlink control channel (PDCCH).

Namely, the PDCCH may include information on the vehicle communication device which needs to receive the PDSCH, frequency and time information of wireless resource of the PDSCH, and transmission format of the PDSCH.

Once the vehicle communication device succeeds in receiving the PDCCH transmitted to the vehicle communication device itself, the random access response transmitted through PDSCH depending on the information of the PDCCH may be appropriately received. Further, the random access response may include a random access preamble identifier (e.g., a random access preamble identifier (RAPID)), an uplink grant indicating an uplink wireless resource, a temporary cell identifier (temporary C-RNTI), and a timing advance command (TAC).

As explained above, a random access (or random connection) preamble identifier is needed in the random access response because one random access response may include random access response information for one or more vehicle communication devices. Hence, it is necessary to indicate which vehicle communication device the UL grant, a temporary cell identifier, and a TAC is valid to.

Here, it is assumed that the vehicle communication device selects a random access preamble identifier coinciding with the random access preamble selected by the vehicle communication device itself in step S402. As such, the vehicle communication device may receive an uplink grant (UL grant), a temporary cell identifier (temporary C-RNTI), and a timing advance command (TAC).

(3) Third Message Transmission (S403)

When the vehicle communication device receives a random access response which is valid to the vehicle communication device itself, information included in the random access response is respectively processed. Namely, the vehicle communication device applies the TAC and saves a temporary cell identifier. Further, in response to reception of a valid random access response, data to be transmitted may be stored in the message 3 buffer.

Further, the vehicle communication device transmits data (e.g., the third message) to the base station by using the received UL approval (S403).

Further, the third message needs to include an identifier of the vehicle communication device. In the contention-based random access process, it is not possible to determine which vehicle communication devices perform the random access procedure, but in order to resolve collision, the vehicle communication device needs to be identified.

Two methods of including the identifier of the vehicle communication device have been discussed. According to the first method, if the vehicle communication device already has a valid cell identifier allocated in the cell before the random access procedure, the vehicle communication device transmits its cell identifier through the uplink transmission signal corresponding to the UL approval. On the other hand, if a valid cell identifier has not been allocated before the random access process, the vehicle communication device includes its unique identifier (e.g., a STMSI or random identifier) so as to be transmitted.

Generally, the unique identifier is longer than the cell identifier. If data corresponding to the UL grant has been transmitted, the vehicle communication device starts a contention resolution timer (CR timer) for collision resolution.

(4) Fourth Message Reception (S404)

The vehicle communication device transmits data including its own identifier through the UL grant included in the random access response, then waits for the direction of the base station for collision resolution. Namely, reception of PDCCH is tried in order to receive a certain message (S404).

Two methods of receiving the PDCCH have been discussed. As mentioned above, when the third message transmitted according to the UL grant is transmitted by using the cell identifier, the reception of PDCCH is tried by using its cell identifier, and when the identifier is a unique identifier, the reception of the PDCCH may be tried by using a random cell identifier included in the random access response.

Thereafter, in the former case, when the PDCCH is received through its cell identifier before the collision resolution time is terminated, the vehicle communication device determines that a random access procedure has been normally performed and terminates the random access procedure.

In the latter case, if PDCCH has been received through a random cell identifier before the collision resolution timer has expired, data transmitted through the PDSCH directed by the PDCCH is checked. If its own identifier is included in the content of the data, the vehicle communication device determines that the random access procedure has been normally performed and terminates the random access procedure.

Further, when the collision resolution procedure through the third message and the fourth message is not successful, the vehicle communication device may restart a random access procedure by selecting another random access preamble. As such, the vehicle communication device may receive a second message from the base station and form a third message for the collision resolution procedure so as to transmit the third message to the base station.

Further, referring to FIG. 5, in the non-contention-based random access procedure, unlike the contention-based random access procedure of FIG. 4, the base station 200 allocates a random access preamble usable by only the base station 200 to the vehicle communication device 100 (S501).

The vehicle communication device 100 performs a random access procedure of transmitting a random access preamble to the base station 200 by using initial transmission power or retransmission power determined in the same scheme as explained in FIG. 4 by using a random access preamble allocated by the base station 200 in the step S501 (S502).

As such, the vehicle communication device may perform a random access procedure without collision with another vehicle communication device unlike the contention-based random access procedure explained in FIG. 4.

Further, when the vehicle communication device 100 receives a random access message from the base station 200 in response to the random access preamble transmitted in the step S502, the connection between the vehicle communication device and the base station is established (S503).

Figure 6:
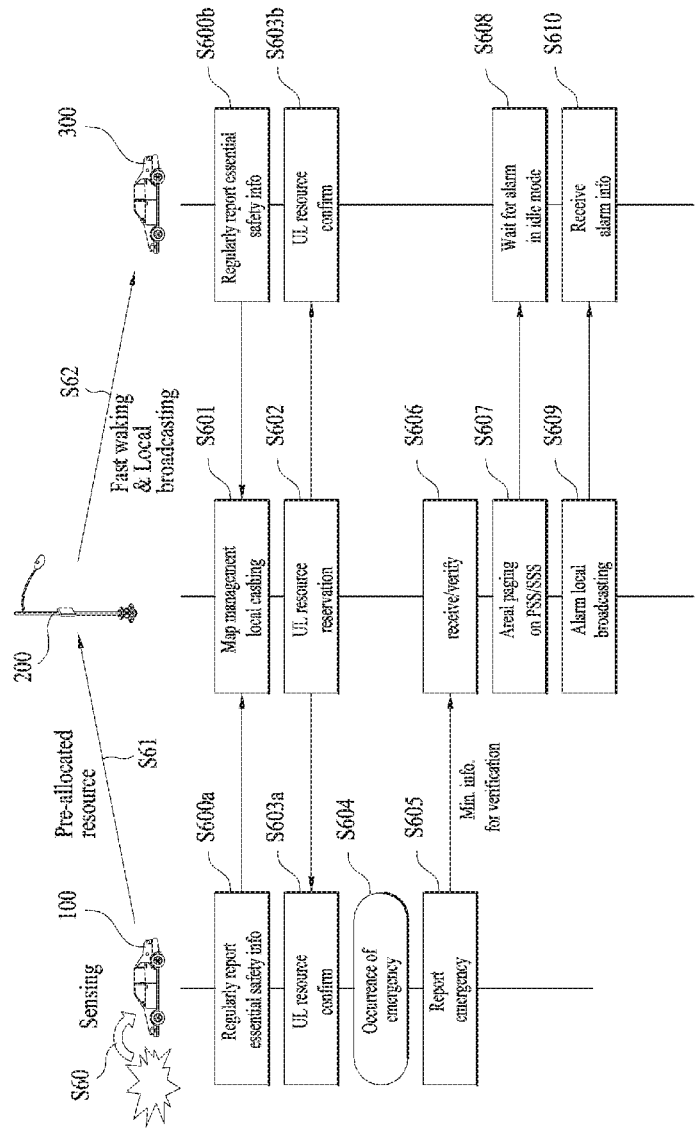
FIG. 6 is a diagram to describe a method of transmitting an emergency signal by a in-vehicle communication device in a wireless communication system according to an embodiment of the present invention.

FIG. 6 is a diagram to describe a method of transmitting an emergency signal by an in-vehicle communication device in a wireless communication system according to an embodiment of the present invention.

Referring to FIG. 6, it is assumed that a wireless communication system according to an embodiment of the present invention includes a vehicle 100 including a communication system, a base station 200, and a neighbor vehicle 300 of the vehicle.

In the present specification, a vehicle 100 including a communication device may sense in advance a dangerous factor or an emergency which may occur in or out of a vehicle during driving, and at this time, the sensing of a dangerous factor or emergency may be performed within a predetermined range through a preinstalled sensor.

Here, the predetermined range includes problems caused with reference to the driving of the vehicle in or out of the vehicle 100 including the communication device and particularly with respect to the inside of the vehicle 100, and particularly with respect to the inside of the vehicle 100, the predetermined range includes problems caused in the inner device of the vehicle 100 or in the vehicle itself such as an engine breakdown and a lack of fuel. Further, with respect to the outside of the vehicle 100, the predetermined range includes problems which may be caused by factors except the vehicle 100 such as an accident of another vehicle and an obstacle in the front, the rear, and the side of the vehicle 100.

Figure 7:
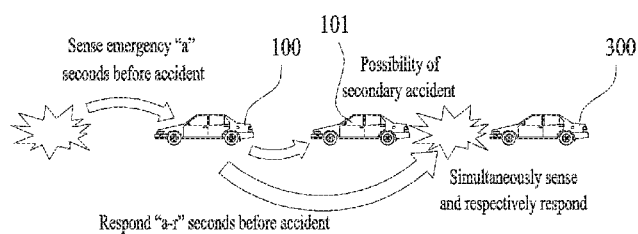
FIG. 7 is a diagram to describe a situation where an in-vehicle communication device should perform communication in a wireless communication system according to the present invention.

Further, referring to FIG. 7, as mentioned above, a dangerous factor or an emergency which may occur in or out of the vehicle may be sensed in advance before "a" seconds before the occurrence of an accident through a sensor installed in advance in the vehicle 100, and the sensed information may be provided to the driver of the vehicle 100 within "r" seconds through an audio sound or a certain display of a dashboard. As such, the driver of the vehicle 100 may take an appropriate measure before "a-r" seconds before the occurrence of an accident according to the provided information.

However, the provided information may be recognized by only the driver of the vehicle 100, and the driver of the neighbor vehicle 300 around the vehicle cannot be provided or recognize the provided information because the neighbor vehicle 300 exists out of the vehicle 100.

As such, even though the driver 100 takes a certain measure according to the provided information (101), the driver of the neighbor vehicle 300 cannot be provided the same information, and thus there is a possibility that the driver of the neighbor vehicle 300 may not be able to take an appropriate measure within the time which can prevent an accident. Hence, as shown in FIG. 7, there is a possibility that an accident or a secondary accident may occur due to the neighbor vehicle 300.

Referring to FIG. 6 again, in order to avoid the above problem, according to an embodiment of the present invention, if a preinstalled senor in the vehicle 100 senses an dangerous factor or an emergency which may occur in or out of the vehicle 100 (S70), the in-vehicle communication device transmits information on the sensed dangerous factor or emergency to the base station 200 by using resource allocated in advance from the base station 200 for transmission of location information of the vehicle 100, to the base station 200 (S61). The base station 200 broadcasts information on the dangerous factor or emergency to other vehicles including the neighbor vehicle 300 so that other vehicles including the neighbor vehicle 300 may sense the dangerous factor or emergency and take an appropriate measure.

Generally, a vehicle includes a generator, and thus in the case of a vehicle communication device included in the vehicle, it may not be necessary to move the radio resource control (RRC) state to the idle state to save energy. However, during the communication, the vehicle communication device may also need to save energy as in a general UE. Hence, it is set forth as a premise in the present specification that even the vehicle communication device may perform the technical feature of the present invention by adjusting the RRC state of the vehicle communication device as in a general UE.

Referring to FIG. 6 again, as mentioned above, it is assumed that a wireless communication system to which the present invention may be applied includes a vehicle 100 including a communication device, a base station 200, and a neighbor vehicle 300 of the vehicle 100. Further, it is assumed that the vehicle 100 including the communication device and the neighbor vehicle 300 of the vehicle performs a radio resource control connection with the base station 200 and moves the state to the RRC idle state for reduction of energy consumption.

According to an embodiment of the present invention, the vehicle 100 including the communication device in the RRC idle state and the neighbor vehicle 300 may regularly report essential safety information to the base station 200 (S700a and S700b).

Further, when there is traffic toward the UE, the UE in the RRC idle state may receive a paging signal from the base station, and thus in order to prepare for the situation, the UE periodically or non-periodically transmits location information of the UE itself to the base station. Likewise, when the UE in the RRC idle state transmits location of the UE itself to the base station so that the base station may keep the latest location information of the UE, this is called a tracking area update (TAU).

In the present invention, the TAU may be applied in the manner that a vehicle 100 including the communication device in the RRC idle state and the neighbor vehicle 300 transmit its own location information to the base station 200. As such, the essential safety information may be understood as information including location information of the vehicle 100 including the communication device and the neighbor vehicle 300.

The base station 200 regularly receiving location information from each of the vehicle 100 including the communication device and the neighbor vehicle 300 may store location information of the vehicle 100 including the communication device and the neighbor vehicle 300 (local cashing) and may manage the stored location information (MAP management) (S601).

Thereafter, the base station 200 may allocate uplink resource for transmission of location information so that changed location information may be additionally transmitted to the base station 200 when there is a change in the location of the vehicle 100 including the communication device and the neighbor vehicle 300 (S602). Further, the vehicle 100 including the communication device and the neighbor vehicle 300 may check the uplink resource allocated by the base station and use an uplink resource for the transmission of the location information (S603*a* and S603*b*).

Further, as explained above, after receiving allocation of an uplink resource for transmission of location information, a dangerous factor may appear or an emergency may occur as illustrated in step S604. In the present specification, it is assumed that a dangerous factor has appeared or an emergency has occurred in the vehicle 100 including the communication device, for the convenience of explanation.

As illustrated in the step S604, when a dangerous factor appears or an emergency occurs, as explained above, a sensor installed in advance in the vehicle including the communication device may sense a dangerous factor which may appear or an emergency which may occur in or out of the vehicle. Then information on the sensed dangerous factor or emergency may be provided to the driver of the vehicle 100 through an audio sound, a certain display of a dashboard, or the like. Further, the communication device within the vehicle 100 may transmit information on the sensed dangerous factor or emergency to the base station 200 without a change of the state in the RRC idle state by using resource allocated in advance from the base station in the steps S602 to S603*a* for transmission of the location information of the vehicle 100 (S605).

The base station 200 having received information on the dangerous factor or emergency from the vehicle 100 by using the uplink resource allocated for transmission of location information may go through the verification process for the received information (S606), and such a verification process of information on the dangerous factor or emergency may improve reliability of information. Namely, as mentioned above, such an improvement of reliability of information is a more emphasized advantage in comparison with the V2V where a direct information exchange is performed between vehicles.

After going through the verification process of information on the dangerous factor or emergency received from the vehicle 100 including the communication device 100, if it is determined that the received information is reliable information, the base station 200 may transmit the received dangerous factor or emergency information to the neighbor vehicle 300 in the RRC idle state, and to this end, the base station 200 may perform areal paging message transmission or initial synchronization through transmission of a primary synchronization signal (PSS) and a secondary synchronization signal (SSS) to the neighbor vehicle 300 (S607). Further, in the process of the areal paging message transmission or initial synchronization, the base station 200 may inform the neighbor vehicle 300 that the purpose of the process is to transmit information on the dangerous factor or emergency, and the areal paging message transmission or initial synchronization process may be performed by various paging schemes or synchronization schemes.

The neighbor vehicle 300 in the RRC idle state having received a message from the base station in step S607 may wait to receive an alarm message indicating information on a dangerous factor or emergency (S608).

The base station 200 may transmit an alarm message indicating a dangerous factor or emergency information received from the vehicle, to the neighbor vehicle 300. At this time, the alarm message may be transmitted in the broadcasting transmission scheme so that the alarm message may be transmitted to other vehicles as well as the neighbor vehicle 300 (S609).

Figure 8:
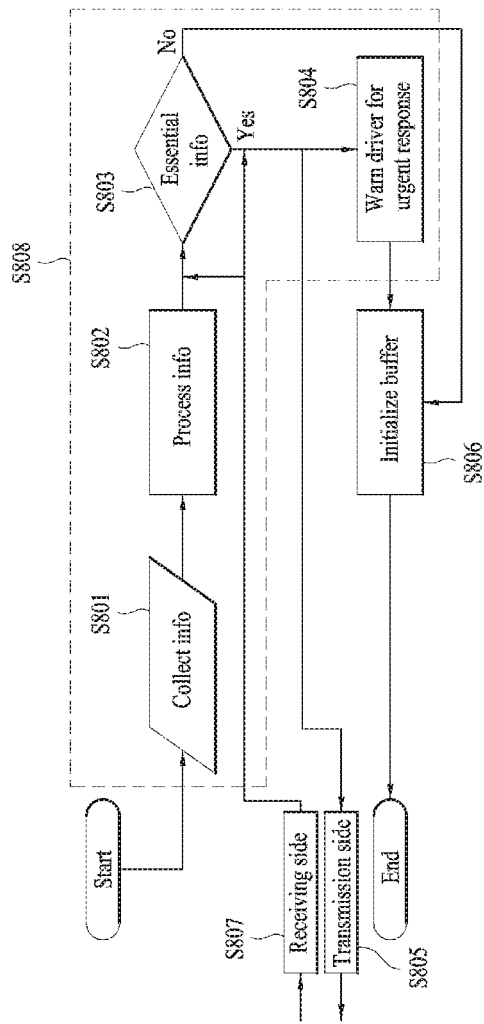
FIG. 8 is a diagram to describe a process of performing communication by collecting dangerous factor or emergency information by a vehicle in a wireless communication system according to the present invention.

The neighbor vehicle 300 may receive an alarm message or a broadcasting message transmitted from the base station 200 in the step S609 (S610), and dangerous factor or emergency information included in the received message may be utilized for preventing an accident which may occur to the neighbor vehicle 300 itself FIG. 8 is a diagram to describe a process of performing communication by collecting dangerous factor or emergency information by a vehicle in a wireless communication system according to the present invention.

Referring to FIG. 8, the sensor installed in advance in the vehicle according to an embodiment of the present invention may sense a dangerous factor or emergency before the occurrence of an accident and may collect the sensed information (S801).

The vehicle may perform an information processing process including the process of storing and analyzing collected information in the step S801 and determine whether the collected information is essential information (S802 and S803).

When it is determined that the collected information is essential information, the in-vehicle communication device may warn the driver of the vehicle by providing information on the sensed dangerous factor or emergency through an audio sound or a specific display of a dashboard so that the driver can urgently take an appropriate measure (S804), and the in-vehicle communication device may additionally transmit information on the dangerous factor or emergency to the base station or the neighbor vehicle through the transmission unit (or transmitter) of the in-vehicle communication device (S805). As such, the driver of the vehicle and the driver of the neighbor vehicle may take an appropriate measure according to the information provided in advance before the occurrence of the accident.

Further, the in-vehicle communication device receives information on the dangerous factor or emergency transmitted from the base station and the neighbor vehicle through the receiving unit (or receiver), and the communication device provides the information to the driver of the vehicle so that the driver can take an appropriate measure in a larger range by being shared on the information on the dangerous factor and emergency (S807).

Further, when it is determined that the collected information is not essential information in the step S803, the in-vehicle communication device may initialize the buffer where information collected and processed in the steps S801 to S802 is stored (S806). Thereafter, the steps S801 to S807 may be repeated to collect and process information on another dangerous factor or emergency.

Figure 9:
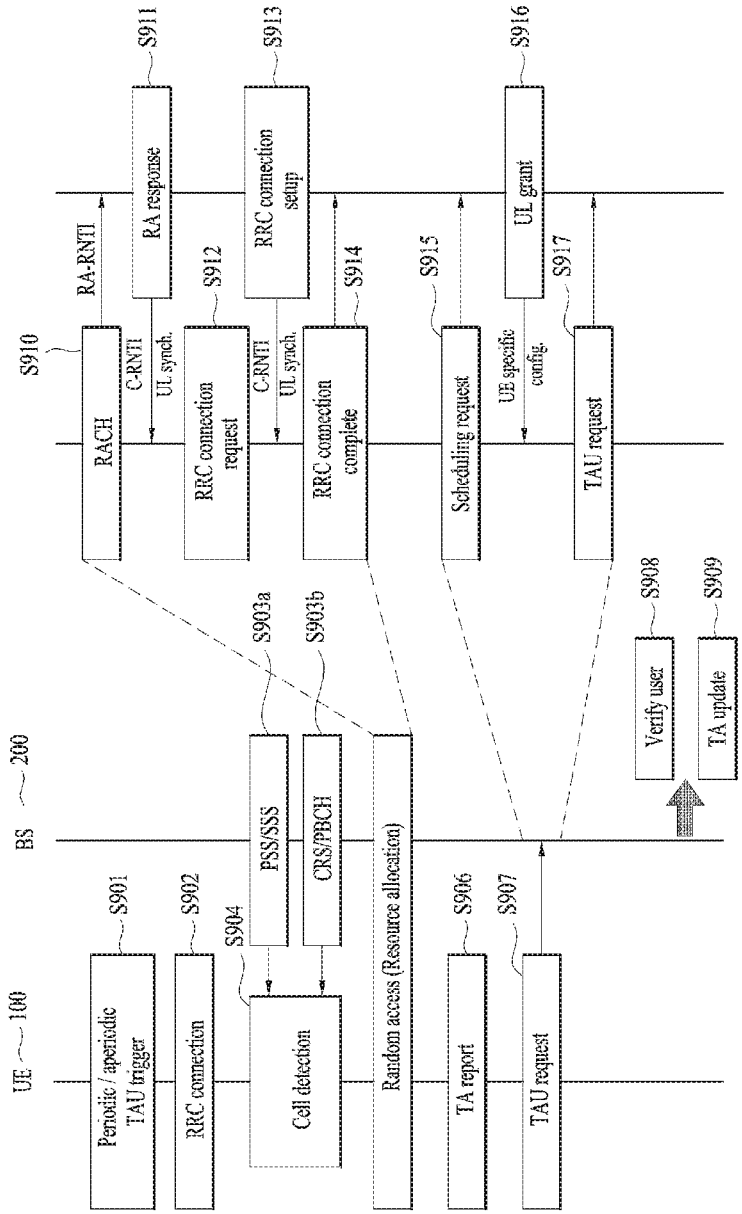
FIG. 9 is a diagram to describe a process where an UE receives allocation of a downlink resource required for transmission of location information from a base station in advance in a wireless communication system applicable in the present invention.

FIG. 9 is a diagram to describe a process where an UE receives allocation of a downlink resource required for transmission of location information from a base station in advance in a wireless communication system applicable in the present invention.

Generally, if there is traffic toward an UE, the UE in the RRC idle state may receive a paging signal from a base station, and thus in preparation of such a situation, the UE periodically or aperiodically transmits its own location information to the base station. Likewise, when the UE in the RRC idle state transmits its own location information to the base station so that the base station may keep the latest location information about the UE, this is called a tracking area update (TAU).

Referring to FIG. 9, an UE 100 in the RRC idle state may need to periodically or aperiodically report its own location information to the base station 200, and in this case, in order to recognize its own location information, the UE may perform RRC connection with the base station 200 (S901 and S902).

In step S1002, the UE 100 performing RRC connection with the base station 200 may receive a primary synchronization signal (PSS), a secondary synchronization signal (SSS), a cell specific reference signal (CRS), and a physical broadcasting channel (PBCH) from the base station 200 so as to receive an areal paging message and perform initial synchronization, whereby it is possible to recognize the current location of the UE itself (S904).

Namely, the UE 100 which goes through S903a or S903b may check an accessable cell or base station or check accessable cell group information in order to recognize the location information of the UE itself (S904).

Thereafter, the UE 100 performs a random access procedure with the base station in order to receive allocation of an uplink resource for transmitting its own location information to the base station 200 (S905).

Further, after completing performance of a random access with the base station 200, if the UE 100 needs to periodically or aperiodically transmit its own location information to the base station 200, the UE 100 may receive allocation of an uplink resource for transmission of location information from the base station 200 and may perform a tracking area update (TAU) procedure for transmitting location information by using the allocated uplink resource (S906 and S907).

The base station 200 receiving location information from the UE 100 goes through the user verification procedure of the UE 100 (S908) and then performs a TA update procedure for the update of the latest location of the UE by using the received location information of the UE (S909).

Further, the performance of the random access procedure in step S905 is as follows. Namely, the UE 100 may transmit a random access preamble by randomly selecting one random access preamble from a set of random access preambles indicated in advance through system information or a handover command and selecting a physical random access channel resource for transmitting the random access preamble, which may include a random access-radio network temporary identity (RA-RNTI) used for receiving a random access response (S910).

Thereafter, the UE may receive a random access response in response to the transmission of the random access preamble, and the random access response may include a random access preamble identifier (RAPID), a uplink grant which indicates an uplink wireless resource, a temporary cell identifier (temporary C-RNTI), and a timing advance command (TAC) (S911).

As explained above, a random access (or random connection) preamble identifier is needed in the random access response because one random access response may include random access response information for one or more vehicle communication devices, and thus it is needed to indicate which vehicle communication device the UL grant, a temporary cell identifier, and a TAC is valid to.

When a UE receives a random access response which is valid to the UE, from the base station, the UE respectively processes information included in the random access response. Namely, the UE applies the time synchronization compensation value and stores a temporary cell identifier. Further, in response to the reception of a valid random access response, data to be transmitted may be stored in a message 3 buffer. Further, the UE may transmit a RRC connection request message for establishing RRC connection with the base station by using the received UL grant (S912).

If receiving a RCC connection request message from the UE, the base station completes setting needed in RRC connection and transmits UE-specific configuration information to the UE so as to establish wireless resource control connection with the UE (S913 and S914).

Further, the TAU procedure for transmitting location information by the UE in the step S907 is as follows. First, the UE may transmit a scheduling request to the base station in order to request a resource for transmitting location information (S915), and the base station may transmit an uplink grant and UE-specific setting information to the UE in response to the request (S916).

The UE may transit a TAU request message including its own location information by using an IL grant received from the base station, whereby the UE may transmit its own location information to the base station (S917).

Figure 10:
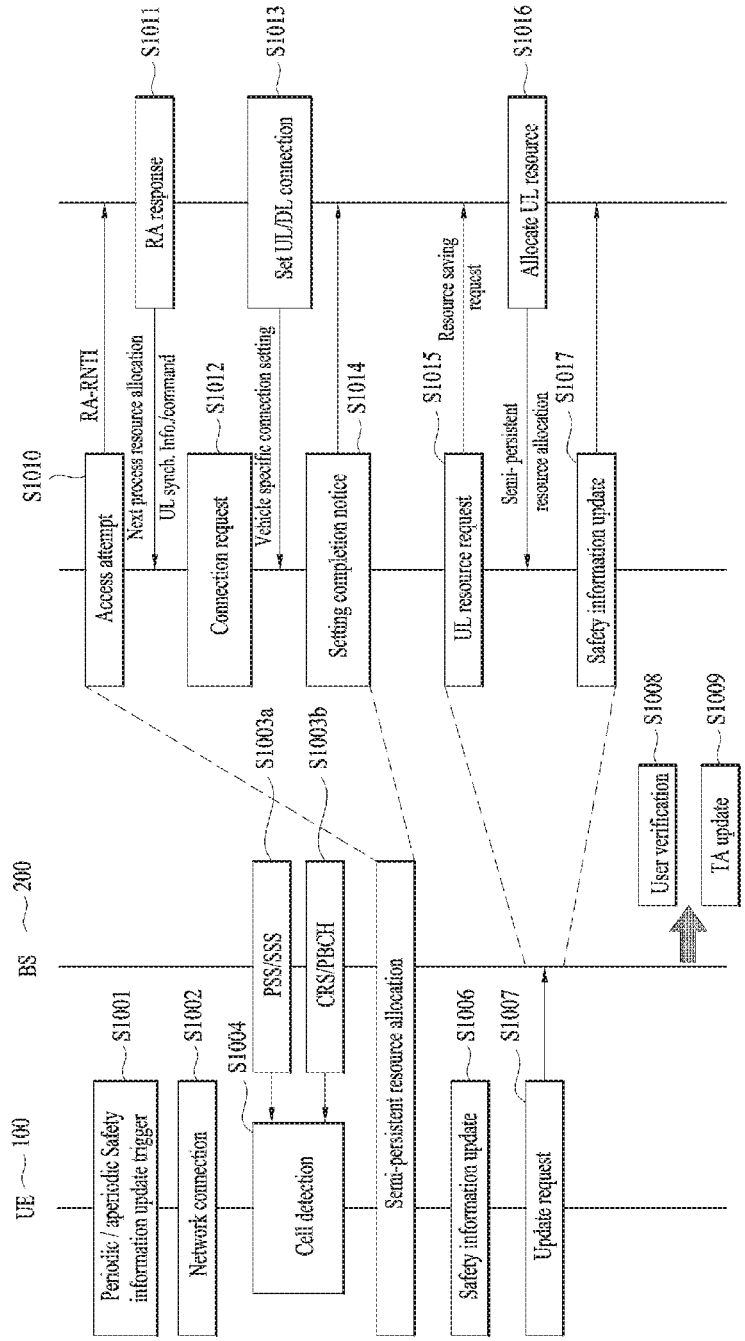
FIG. 10 is a diagram to describe a method of receiving allocation of a downlink resource from a base station by an in-vehicle communication device in advance in a wireless communication system according to an embodiment of the present invention.

FIG. 10 is a diagram to describe a method of receiving allocation of a downlink resource from a base station by an in-vehicle communication device in advance in a wireless communication system according to an embodiment of the present invention.

As mentioned above, generally, if there is traffic toward an UE, the UE in the RRC idle state may receive a paging signal from a base station, and thus in preparation of such a situation, the UE periodically or aperiodically transmits its own location information to the base station. Likewise, when the UE in the RRC idle state transmits its own location information to the base station so that the base station may keep the latest location information about the UE, this is called a tracking area update (TAU).

Referring to FIG. 10, a vehicle including a vehicle communication device 100 in the RRC idle state may need to periodically or aperiodically report its own location information to the base station 200, and in this case, in order to recognize its own location information, the vehicle may perform RRC connection with the base station 200 (S1001 and S1002).

Namely, a vehicle including the vehicle communication device 100 in the RRC idle state may set a network connection with the base station in order to transmit safety information including location information of the vehicle to the base station (S1002), and the network connection may generally correspond to a access procedure which may be performed with the base station in order to receive allocation of an uplink resource from the base station and may particularly include RRC connection.

Further, in step S1002, a vehicle including a vehicle communication device 100 for performing RRC connection with the base station may receive a synchronization signal from the base station so as to receive an areal paging message and perform initial synchronization, thereby recognizing the current location of the vehicle itself including the vehicle communication device 100 (S1003 and S1003b).

Namely, the vehicle including the vehicle communication device 100, which goes through the steps S1003a to S1003b, may check an accessable cell or base station or accessable cell group information in order to recognize its own location information (S1004).

The vehicle including a vehicle communication device 100, which has checked its own location information in step S1004, may perform a access procedure with the base station in order to receive allocation of an uplink resource for transmitting the location information, from the base station 200, and according to an embodiment of the present invention, the access procedure may be performed as a random access procedure and the uplink resource may be semi-persistently allocated (S1005).

Further, after completing a access procedure with the base station 200, if a vehicle including the vehicle communication device 100 periodically or aperiodically needs to transmit its own location information to the base station, a vehicle including the vehicle communication device 100 may receive allocation of an uplink resource for transmission of the location information, from the base station 200 and may perform a tracking area update (TAU) procedure for transmitting the location information by using the allocated uplink resource (S1006 and S1007).

The base station 200 receiving location information from the vehicle including the vehicle communication device 100 goes through the user verification procedure of the vehicle including the vehicle communication device 100 (S1008), then performs a tracking area update (TAU) procedure updating the latest location of the vehicle by using the received location information of the vehicle including the vehicle communication device 100 (S1009).

Further, the access procedure in the step S1005 is as follows. Namely, a vehicle including the vehicle communication device 100 may transmit an access request message to the base station for a access attempt, and the connection request message may include an identifier of the vehicle including the vehicle communication device 100 used for receiving an access response (S1010).

Thereafter, the vehicle including the vehicle communication device 100 may receive an access response in response to the connection request message, and the access response may include information on an uplink grant which informs of uplink wireless resource, a time synchronization compensation value, and an identifier which are needed in transmitting location information in the future by the vehicle including the vehicle communication device 100 (S1011).

When a vehicle including the vehicle communication device 100 receives a valid access response from a base station, the vehicle including the vehicle communication device 100 respectively processes information which is included in the access response. Namely, the vehicle including the vehicle communication device 100 applies the time synchronization compensation value and stores an identifier. Further, data to be transmitted in response to the reception of a valid access response may be stored in message 3 buffer. Further, the vehicle including the vehicle communication device 100 may transmit a connection request message for establishing connection with the base station by using a received UL grant (S1012).

If the base station receives a connection request message from the vehicle including the vehicle communication device 100, the base station completes necessary setting about uplink and downlink connection and transmits set vehicle specific configuration to the vehicle including the vehicle communication device 100, and here, connection is established as a vehicle including the vehicle communication device 100 transmits a notice of setting completion to the base station (S1013 and S1014).

Further, performing a tracking area update (TAU) procedure for transmitting location information by a vehicle including a vehicle communication device 100 in the step S1107 is as follows.

The vehicle including the vehicle communication device 100 may transmit an uplink resource request to the base station in order to request a resource for transmitting location information (S1015).

Further, the vehicle including the vehicle communication device 100 according to an embodiment of the present invention may include information informing that the uplink resource may be used for transmission of an urgent transmission message or a short stream message for transmission of information on the dangerous factor or emergency as well as transmission of the location information, in the uplink resource request message requesting uplink resource allocation for transmission of location information in the step S1015.

Informing that requesting the uplink resource may be used for transmitting information on a dangerous factor or emergency as well as transmitting location information may be performed by mapping each case to a codeword in the uplink resource request message, and at this time, other control information may also be transmitted together after modulation and channel coding.

For example, (1) first, when a vehicle including a vehicle communication device 100 transmits a uplink resource request message to a base station without a mapping for a separate codeword in the step S1015, this means that there is no uplink resource request, and when such an uplink resource request bit is not received, the base station recognizes that there is no uplink resource request. (2) Second, when requesting the uplink resource is simply for transmission of general location information, not for transmission of a dangerous factor or emergency, information indicating such content may be mapped with a codeword (e.g., codeword a0), and the mapped codeword a0 may be included in the uplink resource request message. When such an uplink resource request bit indicates a specific number (e.g., 0), the base station recognizes that the uplink resource request is a request of an uplink resource which may be used for transmission of general location information. (3) Third, when requesting the uplink resource is for transmission of the dangerous factor or emergency as well as transmission of general location information, the information indicating such may be mapped with a codeword (e.g., codeword a1), and the mapped codeword a1 may be included in the uplink resource request message. When such an uplink resource request bit indicates a specific number (e.g., 1), the base station recognizes that the uplink resource request is a uplink resource request for transmission of information on the dangerous factor or emergency as well as transmission of general location information.

As such, according to an embodiment of the present invention, when allocating a necessary uplink resource for transmission of location information, the base station may allocate the uplink resource in consideration of the fact that the uplink resource may be used for transmission of a urgent transmission message or short stream message for transmission of the dangerous factor or emergency, and the uplink resource may be semi-persistently allocated (S1016).

Further, the vehicle communication device 100 in a vehicle may transmit location information of the vehicle to the base station by using the allocated uplink resource (S1017). After transmitting the location information, the state of the vehicle communication device 100 is turned to the RRC idle state.

However, when the vehicle communication device 100 recognizes information on the dangerous factor or emergency in the RRC idle state, thus needs to transmit information on the dangerous factor or emergency to the base station or a neighbor vehicle, the vehicle communication device 100 may use the uplink resource allocated for the transmission of the location information for transmission of information on the dangerous factor or emergency.

Namely, the vehicle including the vehicle communication device 100 may use the allocated uplink resource for transmitting its own location information to the base station, and when information on the dangerous factor or emergency needs to be transmitted to the base station or the neighbor vehicle, the vehicle may promptly transmit information on the dangerous factor or emergency by using the allocated uplink resource without changing the RRC state or going through a separate access procedure in the RRC idle state. As such, a separate connection and resource allocation procedure is not needed on emergency, thereby decreasing latency due to a separate connection and resource allocation procedure.

Further, the signal quality may be deteriorated depending on the signal route or the environment where signals are used in the wireless communication environment, but in order to prevent such a deterioration, a diversity scheme may be used as a scheme of transmitting signals when the signals are transmitted.

The situation where the vehicle including the vehicle communication device 100 needs to transmit information on the dangerous factor or emergency may occur several milliseconds or hundreds of milliseconds after receiving allocation of an uplink resource from the base station in the step S1016, and thus uplink channel variation or channel variation may occur. Hence, it may be necessary to prevent such a variation.

Figure 11:
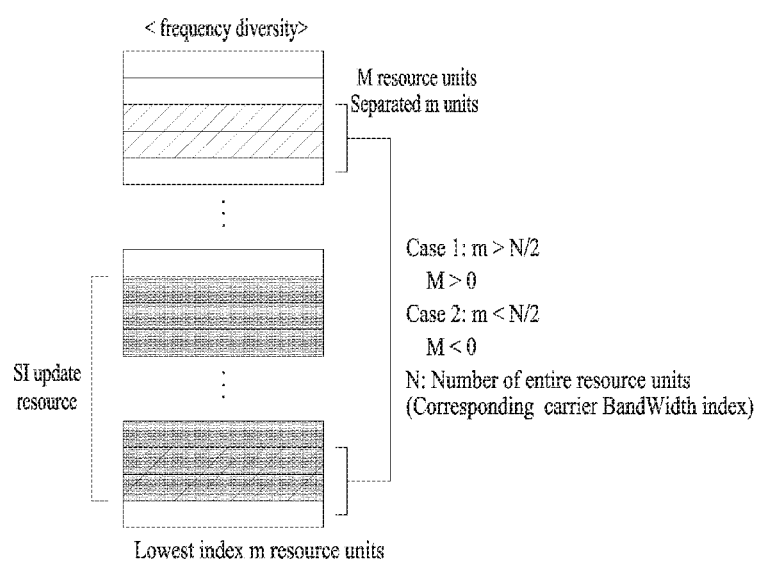
FIG. 11 is a diagram to describe a method of receiving allocation of a downlink resource from a base station by an in-vehicle communication device in advance in a wireless communication system according to an embodiment of the present invention.

According to an embodiment of the present invention, when the base station allocates the uplink resource to a vehicle including a vehicle communication device 100 in step S1015, a frequency diversity scheme may be used for transmission as shown in FIG. 11.

Namely, as illustrated in FIG. 11, when an uplink resource is allocated, the uplink resource may be allocated with m resource units corresponding to the lowest index, and the uplink resource may also be allocated by using m resource units corresponding to the upper index placed away from the lowest index by the size of M. At this time, when the number of m resource units is greater than the half of the number of the entire resource units, the size of M may be greater than 0, but if the number of m resource units is smaller than the half of the number of the entire resource units, the size of M may be smaller than 0. Further, the base station may include the values m and M in system information or an uplink resource allocation message and inform the vehicle communication device 100 of the values m and M.

Further, according to an embodiment of the present invention, when the base station allocates the uplink resource to a vehicle including the vehicle communication device 100 in the step S1015, a spatial diversity scheme as well as the frequency diversity scheme may be used for transmission.

Whether such a spatial diversity scheme is to be supported may be determined according to the capability of the vehicle communication device 100 and the capability of the base station. A vehicle including the vehicle communication device 100 may indicate whether the spatial diversity is to be supported when reporting the capability to the base station. The base station may also indicate whether the spatial diversity is to be supported through the system information transmitted to the vehicle including the vehicle communication device 100. Hence, the spatial diversity scheme may be used through such a process.

Figure 12:
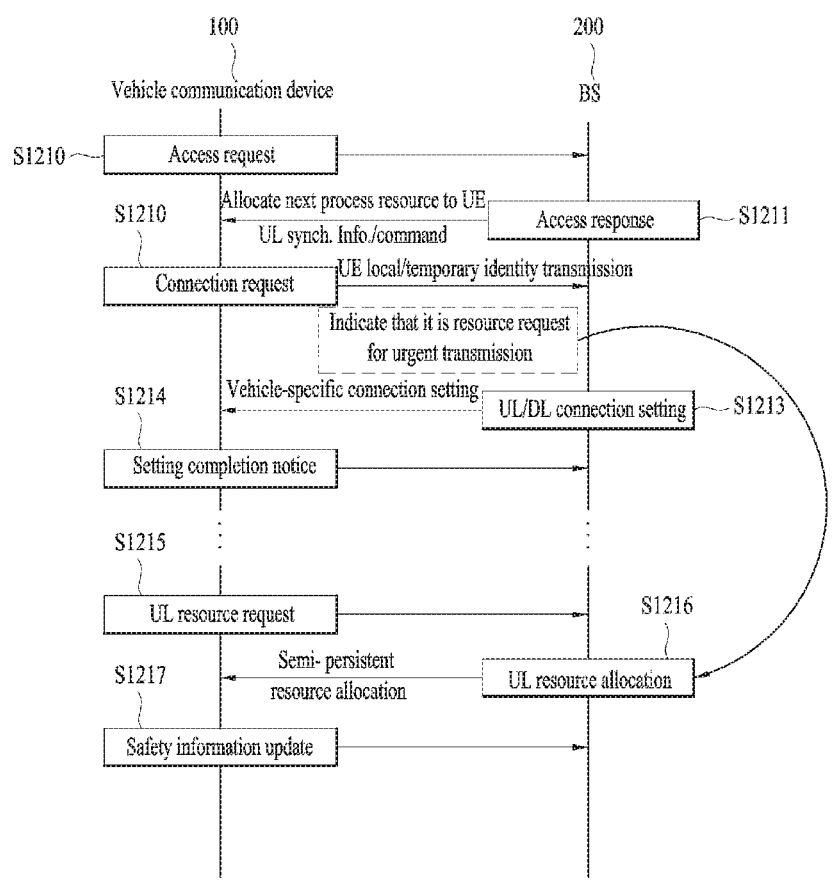
FIG. 12 is a diagram to describe a method of receiving allocation of a downlink resource from a base station by an in-vehicle communication device in advance in a wireless communication system according to an embodiment of the present invention.

FIG. 12 is a diagram to describe a method of receiving allocation of a downlink resource from a base station by an in-vehicle communication device in advance in a wireless communication system according to an embodiment of the present invention.

Referring to FIG. 12, the procedure where the vehicle communication device 100 is connected to the base station 200 is as follows. Namely, the vehicle communication device 100 in a vehicle may try connection to the base station 200, and to this end, the vehicle communication device 100 may transmit a connection request message to the base station (S1210).

Thereafter, the vehicle communication device 100 may receive an access response from the base station 200 in response to the access attempt or the access request message, and the access response may include information on a UL grant, a time synchronization compensation value, and an identifier indicating an uplink wireless resource which the vehicle including the vehicle communication device 100 use to transmit the location information in the future (S1211).

When the vehicle communication device 100 receives a valid access response from the base station 200, the vehicle communication device 100 respectively processes information included in the access response. Namely, the vehicle communication device 100 in the vehicle applies the time synchronization compensation value and stores the identifier. Further, in response to reception of a valid access response, the vehicle communication device 100 may store data to be transmitted, in message 3 buffer. Further, the vehicle communication device 100 may transmit a connection request message for establishing connection with the base station by using a received UL grant (S1212).

Further, according to an embodiment of the present invention, the vehicle communication device 100 in a vehicle may include information on the purpose of connection establishment and the identifier of the vehicle or the vehicle communication device 100, in the connection request message so as to be transmitted.

Particularly, the connection request message may additionally include a new field requesting allocation of a resource for transmission of an urgent message as well as emergency, mt-access, mo-signaling, and mo-data fields which are disclosed in the establishment cause of the LTE standard so as to be transmitted, and the name of the new field will be called a resource hold field in the present specification, but the name may be freely called depending on the setting.

Likewise, adding a resource allocation request for transmission of an urgent message to accurately inform the base station of such a connection characteristic because a quick connection is essential when an urgent message is transmitted.

The vehicle communication device 100 in the vehicle may include information indicating the identifier and the establishment cause of the vehicle or the vehicle communication device 100 in the connection request message so as to be transmitted, and information indicating the establishment cause (the purpose of the connection request) may include a resource hold field requesting a resource allocation for transmission of an urgent message (S1212).

If the base station 200 receives the connection request message from the vehicle communication device 100, the base station 200 completes necessary setting about the uplink and downlink connection and transmits the vehicle-specific configuration set for the vehicle-specific connection setting is transmitted to the vehicle communication device 100, and the connection is established as the vehicle communication device 100 transmits the notice of completion of setting to the base station (S1213 and S1214).

Thereafter, the vehicle communication device 100 in the vehicle may transmit the uplink resource request to the base station in order to request a resource for transmitting the location information (S1215).

As such, the base station 200 may allocate an uplink resource needed for transmission of location information. In this case, the base station 200 may consider that the necessary uplink resource may also be used in the urgent transmission message or short stream message for transmission of the dangerous factor or emergency, by using the received information indicating the purpose of the connection request including the resource hold field and the identifier of the vehicle or the vehicle communication device 100 in step S1212.

As such, the base station may allocate the uplink resource to the vehicle communication device 100 in consideration of such a situation, and the uplink resource may be semi-persistently allocated (S1216).

Further, the vehicle communication device 100 in the vehicle may transmit location information of the vehicle to the base station by using the allocated uplink resource. After transmission of the location information, the state of the vehicle communication device 100 is turned to the RRC idle state.

However, when the information on the dangerous factor or emergency is recognized in the RRC idle state and such information on the dangerous factor or emergency needs to be transmitted to the base station or neighbor vehicle, the vehicle communication device 100 may use the uplink resource allocated for transmission of the location information for transmission of information on the dangerous factor or emergency (S1217).

Namely, the vehicle including the vehicle communication device 100 may use the allocated uplink resource for transmission of its own location information to the base station, and when information on the dangerous factor or emergency needs to be transmitted to the base station or the neighbor vehicle, the vehicle may promptly transmit information on the dangerous factor or emergency by using the allocated uplink resource without changing the RRC state or going through a separate access procedure in the RRC idle state. As such, a separate connection and resource allocation procedure is not needed on emergency, thereby decreasing latency due to a separate connection and resource allocation procedure.

Figure 13:
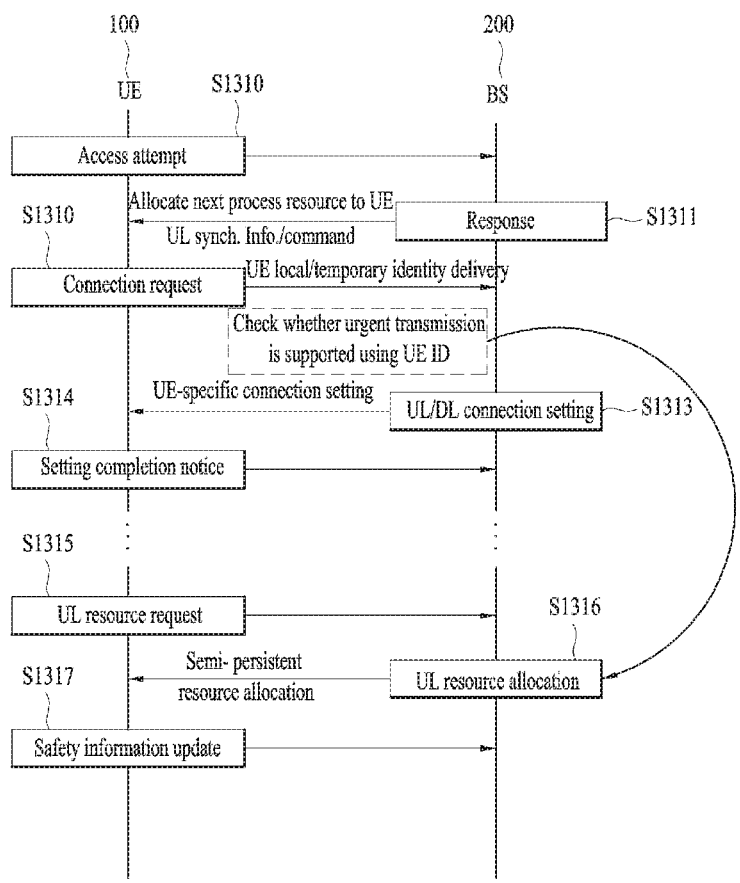
FIG. 13 is a diagram to describe a method of receiving allocation of an uplink resource from a base station by an in-vehicle communication device in advance in a wireless communication system according to an embodiment of the present invention.

FIG. 13 is a diagram to describe a method of receiving allocation of an uplink resource from a base station by an in-vehicle communication device in advance in a wireless communication system according to an embodiment of the present invention.

Referring to FIG. 13, the procedure for the connection of a vehicle communication device 100 to the base station 200 is as follows. Namely, the vehicle communication device 100 in a vehicle may try connection to the base station 200, and to this end, the vehicle communication device 100 may transmit a connection request message to the base station, and the connection request message may include the identifier of the vehicle or the vehicle communication device 100 (S1310).

Thereafter, the vehicle communication device 100 may receive an access response from the base station 200 in response to the access attempt or the access request message (S1311). At this time, the access response may include information on a UL grant, a time synchronization compensation value, and an identifier indicating an uplink wireless resource which the vehicle including the vehicle communication device 100 use to transmit the location information in the future. Further, the base station 220 may generate a global identifier and a local identifier of the vehicle communication device 100 so that the generated local identifier and the capability request of the vehicle communication device may be included in the access response so as to be transmitted to the vehicle communication device 100.

When the vehicle communication device 100 receives a valid access response from the base station 200, the vehicle communication device 100 respectively processes information included in the access response. Namely, the vehicle communication device 100 in the vehicle applies the time synchronization compensation value and stores the identifier. Further, in response to reception of a valid access response, the vehicle communication device 100 may store data to be transmitted, in message 3 buffer. Further, the vehicle communication device 100 may transmit a connection request message for establishing connection with the base station by using a received UL grant (S1312).

Further, in response to a capability request included in the received access response, the vehicle communication device 100 in the vehicle may include the capability of the vehicle communication device 100 in the connection request message so as to be transmitted to the base station (S1411).

At this time, the capability of the vehicle communication device 100 may include information indicating that the vehicle communication device 100 supports an urgent transmission message or a short stream message.

If the base station receives a connection request message including the capability from the vehicle communication device 100, the base station completes setting about the necessary uplink and downlink connection, transmits the vehicle specific configuration set for the vehicle specific connection setting, to the vehicle communication device 100, and the vehicle communication device 100 transmits the notice of completion of setting to the base station, whereby connection is established (S1313 and S1314).

Thereafter, the vehicle communication device 100 in the vehicle may transmit an uplink resource request to the base station in order to request a resource for transmitting location information (S1315).

As such, the base station may allocate a necessary uplink resource for transmission of location information. In this case, the base station 200 may recognize that the vehicle communication device 100 supports transmission of the urgent transmission message or short stream message by using information included in the capability of the vehicle communication device received in step S1312 and may allocate resource in consideration of the fact that the necessary uplink resource may also be used in the transmission of the urgent transmission message or short stream message for transmission of the dangerous factor or emergency.

As such, the base station may allocate uplink resource to the vehicle communication device 100 in consideration of the above situation, and the uplink resource may be semi-persistently allocated (S1316).

Further, the vehicle communication device 100 within the vehicle may transmit location information of the vehicle to the base station by using the allocated uplink resource. After transmitting the location information, the state of the vehicle communication device 100 is changed to the RRC idle state.

However, when the vehicle communication device 100 recognizes information on the dangerous factor or emergency in the RRC idle state, thus needs to transmit information on the dangerous factor or emergency to the base station or a neighbor vehicle, the vehicle communication device 100 may use the uplink resource allocated for the transmission of the location information for transmission of information on the dangerous factor or emergency (S1317).

Namely, the vehicle including the vehicle communication device 100 may use the allocated uplink resource for transmission of its own location information to the base station, and when information on the dangerous factor or emergency needs to be transmitted to the base station or the neighbor vehicle, the vehicle may promptly transmit information on the dangerous factor or emergency by using the allocated uplink resource without changing the RRC state or going through a separate access procedure in the RRC idle state. As such, a separate connection and resource allocation procedure is not needed on emergency, thereby decreasing latency due to a separate connection and resource allocation procedure.

Figure 14:
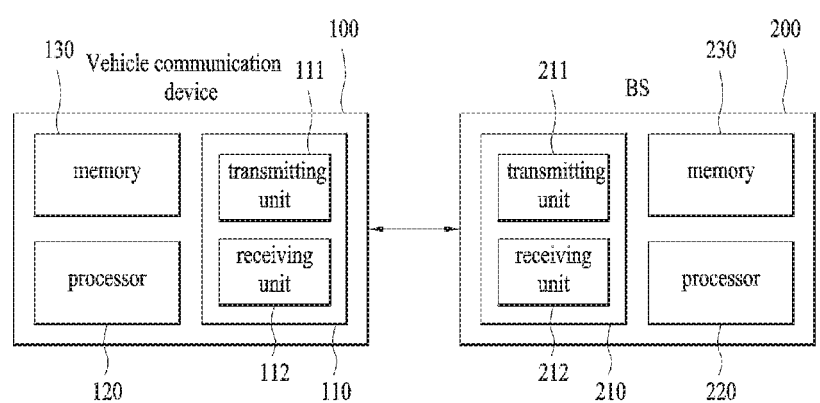
FIG. 14 is a block diagram of an in-vehicle communication device receiving allocation of a downlink resource from a base station in advance and using the allocated downlink resource in communication in a wireless communication system according to an embodiment of the present invention.

FIG. 14 is a block diagram of an in-vehicle communication device receiving allocation of a downlink resource from a base station in advance and using the allocated downlink resource in communication in a wireless communication system according to an embodiment of the present invention.

FIG. 14 illustrates a 1:1 communication environment between the vehicle communication device 100 and the base station 200, but the communication environment may be established between a plurality of vehicle communication devices and the base station.

In FIG. 14, the vehicle communication device 100 may include a radio frequency (RF) unit 100 including a transmission unit 111 and a reception unit 112, a processor 120, and a memory 130.

The overall process of communication such as a signal process and a hierarchical process of the vehicle communication device 100 is controlled by the processor 120 and the memory 130. Further, a connection relation may be formed among the RF unit 110, the processor 120, and the memory 130.

The RF unit 110 included in the vehicle communication device 100 may include the transmission unit 111 and the reception unit 112. The transmission unit 111 and the reception unit 112 may be formed to transmit and receive signals with the base station 200 or other devices.

The processor 120 may be functionally connected to the transmission unit 111 and the reception unit 112 within the RF unit so that the transmission unit 111 and the reception unit 112 may control the process of transmitting/receiving signals to/from the base station 200 and other devices. Further, the processor 120 may perform various processes for the signals to be transmitted so as to be transmitted to the transmission unit 111 and may perform the process for the signals received by the reception unit 112.

When necessary, the processor 120 may save information included in the exchanged message to the memory 130. With the above the structure, the vehicle communication device 100 may perform the above-explained methods of various embodiments of the present invention.

The RF unit 210 including the transmission unit 211 and the reception unit 212 of the base station 200 is configured to transmit/receive signals to/from the vehicle communication device 100. Further, the processor 220 of the base station 200 may be functionally connected to the transmission unit 211 and the reception unit 212 so that the transmission unit 211 and the reception unit 212 may control the process of transmitting/receiving signals to/from other devices including the vehicle communication device 100.

Further, the processor 220 may perform various processes for the signals to be transmitted so as to be transmitted to the transmission unit 211 and may perform the process for the signals received by the reception unit 212.

When necessary, the processor 220 may save information included in the exchanged message to the memory 230. With the above the structure, the base station 200 may perform the above-explained schemes of various embodiments of the present invention.

The processors 120 and 220 of the vehicle communication device 100 and the base station 200 direct (e.g., control, coordinate, and manage) operations of the vehicle communication device 100 and the base station 200. Respective processors 120 and 220 may be connected to memories 130 and 230 allowing storing program codes and data. The memories 130 and 230 may be connected to the processors 120 and 220 so as to store the operating system, application, and general files.

The processors 120 and 220 of the present invention may also be called controllers, microcontrollers, microprocessors, microcomputers, etc. Further, the processors 120 and 220 may be implemented in hardware, firmware, software, or a combination thereof.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The communication method of a communication device in a vehicle of the present invention may be applicable to various wireless communication systems.

What is claimed is:

1. A method of performing communication by an in-vehicle communication device in a wireless communication system, the method comprising:
performing a connection to a base station by the in-vehicle communication device;
transmitting a capability information indicating whether the in-vehicle communication device supports transmission of an emergency signal;
receiving allocated uplink resource information from the base station,
wherein a location information is periodically transmitted by the in-vehicle communication device to the base station using the allocated uplink resource information; and
when the in-vehicle communication device detects information related to a corresponding emergency situation, transmitting the emergency signal by using the allocated uplink resource information without changing an existing RRC idle state to an RRC active state, wherein the emergency signal is transmitted using an uplink resource allocated to the location information in accordance with the allocated uplink resource information.

2. The method of claim 1, the method further comprising:

transmitting an uplink resource request message requesting the allocated uplink resource information used in transmission of the location information of the in-vehicle communication device, wherein the uplink resource request message includes a codeword informing that the allocated uplink resource is available for an emergency signal transmission.

3. The method of claim 1, wherein the allocated uplink resource information is transmitted from the base station by using either a frequency diversity scheme or a spatial diversity scheme.

4. The method of claim 1, further comprising:

transmitting a connection request message to the base station, the connection request message including information indicating that an uplink resource allocation is requested for transmission of the emergency signal, and wherein the uplink resource is allocated by the base station based on information included in the connection request message.

5. The method of claim 1, wherein the allocated uplink resource information from the base station is semi-persistent.

6. For an in-vehicle communication device for performing communication with a base station in a wireless communication system, an apparatus comprising:

a radio frequency unit including a transmitting unit and a receiving unit; and a processor configured to support a communication execution by being connected to the transmission unit and the reception unit, wherein the processor is further configured to:
perform a connection to the base station,
transmit a capability information indicating whether the in-vehicle communication device supports transmission of an emergency signal,
receive allocated uplink resource information from the base station, wherein a location information is periodically transmitted by the in-vehicle communication device to the base station using the allocated uplink resource information, and when the in-vehicle communication device detects information related to a corresponding emergency situation, transmit the emergency signal by using the allocated uplink resource information without changing an existing RRC idle state to an RRC active state, wherein the emergency signal is transmitted using an uplink resource allocated to the location information in accordance with the allocated uplink resource information.

7. The apparatus of claim 6, wherein the processor controls an uplink resource request message requesting the allocated uplink resource information used in a transmission of location information of the vehicle to be transmitted to the base station, and wherein the uplink resource request message includes a codeword forming that the allocated uplink resource information is available for an emergency signal transmission.

8. The apparatus of claim 6, wherein the allocated uplink resource information is transmitted from the base station by using either a frequency diversity scheme or a spatial diversity scheme.

9. The apparatus of claim 6, wherein the processor transmits a connection request message to the base station, the connection request message including information indicating that the resource allocation is requested for an emergency signal transmission, and wherein the uplink resource is allocated by the base station based on information included in the connection request message.

10. The apparatus of claim 6, wherein the allocated uplink resource information from the base station is semi-persistent.

* * * * *